(12) United States Patent
Jansen

(10) Patent No.: US 11,540,461 B2
(45) Date of Patent: Jan. 3, 2023

(54) SYSTEM FOR GROWING PLANTS OUT OF SEEDS ON A WATER SURFACE

(71) Applicant: Maan Intellectual Properties B.V., Raalte (NL)

(72) Inventor: Andreas Willibrordus Maria Jansen, Wijhe (NL)

(73) Assignee: Maan Intellectual Properties B.V., Raalte (NL)

( * ) Notice: Subject to any disclaimer, the term of this patent is extended or adjusted under 35 U.S.C. 154(b) by 113 days.

(21) Appl. No.: 16/097,729

(22) PCT Filed: May 8, 2017

(86) PCT No.: PCT/EP2017/060880
§ 371 (c)(1),
(2) Date: Oct. 30, 2018

(87) PCT Pub. No.: WO2017/194446
PCT Pub. Date: Nov. 16, 2017

(65) Prior Publication Data
US 2019/0307086 A1    Oct. 10, 2019

(30) Foreign Application Priority Data
May 12, 2016 (EP) ..................................... 16169328

(51) Int. Cl.
*A01G 31/02* (2006.01)

(52) U.S. Cl.
CPC ............. *A01G 31/02* (2013.01); *Y02P 60/21* (2015.11)

(58) Field of Classification Search
CPC ............. A01G 31/02; A01G 2031/006; A01G 2031/00
USPC .......................................................... 47/59 R
See application file for complete search history.

(56) References Cited

U.S. PATENT DOCUMENTS

| | | | | | |
|---|---|---|---|---|---|
| 1,775,831 | A | * | 9/1930 | Salisbury | A01G 9/021 47/65.5 |
| 2,189,510 | A | * | 2/1940 | Swaney | A01G 31/02 47/63 |
| 2,531,562 | A | * | 11/1950 | Eve | A01G 9/028 47/80 |
| 2,884,740 | A | * | 5/1959 | Hollander | A01G 9/00 47/61 |
| 4,513,533 | A | * | 4/1985 | Gething | A01G 31/045 47/63 |
| 4,622,775 | A | * | 11/1986 | Glenn | A01G 31/02 47/63 |
| 4,887,716 | A | * | 12/1989 | Abraham | A47K 3/004 206/427 |
| 4,926,584 | A | * | 5/1990 | Horibata | A01G 31/02 47/59 R |

(Continued)

FOREIGN PATENT DOCUMENTS

| EP | 0514558 A1 | 11/1992 |
|---|---|---|
| WO | 2013021073 A1 | 2/2013 |
| WO | 2015002529 A2 | 1/2015 |

*Primary Examiner* — Ebony E Evans
(74) *Attorney, Agent, or Firm* — The Webb Law Firm

(57) ABSTRACT

The invention relates to a system for growing plants out of seeds on a water surface. The system has a buoyant plate with a number of passages extending between the top surface and the parallel bottom surface. The plate floats on a water surface. A container is arranged in each passage and a growing seed is arranged in each container.

19 Claims, 3 Drawing Sheets

(56) References Cited

U.S. PATENT DOCUMENTS

| | | | | |
|---|---|---|---|---|
| 5,261,185 A * | 11/1993 | Koide | ............. | A01G 31/02 47/63 |
| 6,014,838 A * | 1/2000 | Asher | ............. | A01G 9/00 47/39 |
| 7,448,163 B2 * | 11/2008 | Beeman | ............. | A01G 9/00 47/60 |
| 9,756,792 B2 * | 9/2017 | Miller | ............. | A01G 9/0297 |
| 2002/0062770 A1 * | 5/2002 | Layt | ............. | A01G 9/02 111/105 |
| 2005/0274073 A1 * | 12/2005 | Brooke | ............. | A01G 31/02 47/59 R |
| 2008/0078118 A1 * | 4/2008 | Bissonnette | ............. | A01G 9/0293 47/63 |
| 2012/0055086 A1 * | 3/2012 | Van Der Knaap | ............. | A01G 31/02 47/59 R |
| 2013/0232871 A1 * | 9/2013 | Kempf | ............. | A01G 9/029 47/73 |
| 2016/0366845 A1 | 12/2016 | Visser et al. | | |
| 2017/0238486 A1 * | 8/2017 | De Feo | ............. | A01G 9/021 |
| 2018/0007849 A1 * | 1/2018 | Cohen | ............. | A01K 63/003 |

* cited by examiner

SYSTEM FOR GROWING PLANTS OUT OF SEEDS ON A WATER SURFACE

CROSS REFERENCE TO RELATED APPLICATIONS

This application is the United States national phase of International Application No. PCT/EP2017/060880 filed May 8, 2017, and claims priority to European Patent Application No. 16169328.8 filed May 12, 2016, the disclosures of which are hereby incorporated in their entirety by reference.

BACKGROUND OF THE INVENTION

Filed of the Invention

The invention relates to a system for growing plants out of seeds on a water surface.

Description of Related Art

It is known in plant cultivation to grow plants in a substrate out of a seed. When the plants have become big enough, the plants are repotted to provide sufficient space for the root system of the plant to grow further.

It is also known to place the grown plants with the substrate in a buoyant body and then on a water surface. The already grown roots will contact the water and absorb the growth substances from the water to grow further. As the root system is not limited to the size of the pot, as is the case when the plant would be repotted, the plant can grow to its desired size and does not need to be repotted further.

The use of a substrate could result, by handling or growth of the plants, in substrate particles being trapped in the plants. In case of a lettuce plant, the substrate particles could get stuck between the leaves of the plant and when the lettuce is consumed, the consumer could experience sand-like particles between the lettuce leaves. This is undesired.

Also, using a substrate for growing plants results in a considerable amount of waste, when the grown plants are harvested. Although this waste can be composted, the substrate will pollute the water, which then needs to be cleaned and filtered.

It is an object of the invention to reduce the above mentioned disadvantages.

SUMMARY OF THE INVENTION

This object is achieved with a system for growing plants out of seeds on a water surface, which system comprises:
  a buoyant body having a flat bottom surface and a flat top surface parallel to the flat bottom surface, wherein the buoyant body is provided with a plurality of passages extending from the top surface to the bottom surface; and
  a plurality of containers arranged in the plurality of passages, wherein each container has at least a bottom wall with an open structure for passage of the roots of a seed, wherein each container has a peripheral wall upstanding along the peripheral edge of the bottom wall and wherein each container has height positioning means for positioning the bottom wall of a container at a set height relative to the bottom surface of the buoyant body.

The use of containers with a bottom wall with an open structure and by arranging the containers in a buoyant body floating on water allows for seeds to be deposited in the containers, without any substrate. The seeds will still be able to grow into plants as the seeds can develop roots, which grow through the open structure of the bottom wall and are able to reach the water surface.

Because the containers are provided with height positioning means, the bottom wall and therefore the seed resting on the bottom wall can be positioned at a suitable height above the water surface. This ensures that depending on the type of seed, the first roots of the seed will be able to reach the water in order to absorb water and nutrients, such that the plant can grow further.

In a preferred embodiment of the system according to the invention the height positioning means comprise a horizontal flange arranged to the upper edge of the upstanding peripheral wall, which horizontal flange is supported on the flat top surface of the buoyant body.

The horizontal flange on each container ensures that the container is positioned at a defined position relative to the top surface and as a result also to the parallel bottom surface, which in turn ensures that the bottom wall of the container is at a defined position relative to the bottom wall and therefore to the water surface.

In another embodiment of the system according to the invention the height positioning means are provided by a tapering shape of the peripheral wall of the containers and a correspondingly tapering wall of the passages.

By producing the passages and the containers accurately, the bottom wall of each container can also be accurately positioned at a desired height due to the correspondingly tapering walls.

In a further preferred embodiment of the system according to the invention the bottom wall of the container is provided with a dent for reception and positioning a seed on the bottom wall.

By providing a dent in the bottom wall, a seed can be dropped in the container and will automatically be centered into the dent. This ensures that the seed is positioned in the center of the container bottom wall, which ensures the optimal growth of the plant, as it will be as far as possible from the surrounding peripheral wall of the passage.

In yet another embodiment of the system according to the invention the peripheral wall has an open structure and wherein the open structure of the bottom wall is more open than the open structure of the peripheral wall.

By ensuring that the peripheral wall has a less open structure, than the bottom wall, the shape of the container can easily be maintained, while the bottom wall is as open as possible for a seed to grow roots through.

In a further preferred embodiment of the system according to the invention the bottom wall and peripheral wall of the containers are composed out of fibers of plastic, which are adhered to each other, for example manufactured by swirling a liquid jet of plastic onto a mould.

Swirling of a liquid jet of plastic onto a mould provides an easy manufacturing method for producing containers with a bottom wall having an open structure and a peripheral wall having an open structure, less open than the bottom wall.

Preferably, the plastic fibers are of a biodegradable material, such as polyactic acid (PLA). This allows for the containers with the root system to be discarded as biodegradable waste, when the plant has been harvested.

BRIEF DESCRIPTION OF THE DRAWINGS

These and other features of the invention will be elucidated in conjunction with the accompanying drawings.

DESCRIPTION OF THE INVENTION

Figure 1:
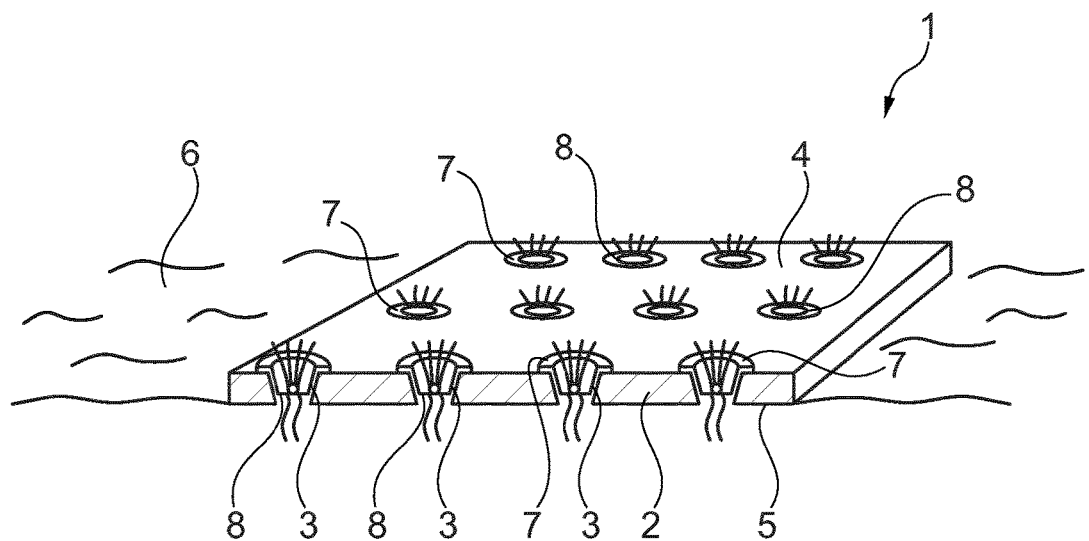
FIG. 1 shows a partial cross-sectional perspective view of an embodiment of a system according to the invention.

FIG. 1 shows a system 1 according to the invention. The system 1 has a buoyant plate 2 with a number of passages 3 extending between the top surface 4 and the parallel bottom surface 5. The plate 2 floats on a water surface 6. A container 7 is arranged in each passage 3 and a growing seed 8 is arranged in each container 7.

Figure 2:
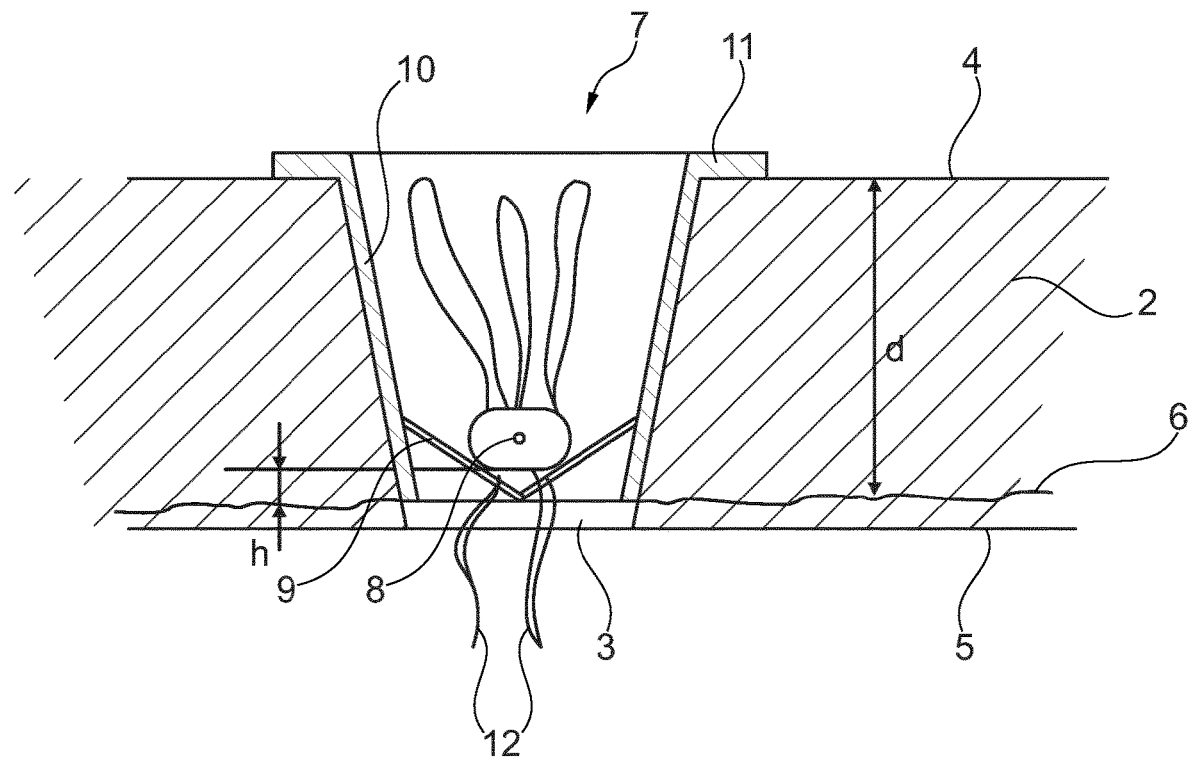
FIG. 2 shows a cross-sectional view of the system of FIG. 1.

FIG. 2 shows the system 1 in more detail. The plate 2 has a top surface 4 and a parallel bottom surface 5. A passage 3 with a tapering peripheral wall extends between these two surfaces 4, 5.

A container 7 is positioned in this passage 3. The container has a bottom wall 9 and a tapering peripheral wall 10. At the top edge of this peripheral wall 10, a horizontal flange 11 is arranged, with which the container 7 is supported on the top surface 4 of the plate 2.

The bottom wall 9 is provided with a dent, such that a seed 8 is centered on the bottom wall 9. Due to the flange 11 the distance d to the water surface 6 is defined. This allows for a reliable positioning of the seed 8 relative to the water surface 6 and ensures that the height h of the seed 8 to the water surface 6 is such that the roots 12 can reach the water.

Figure 3:
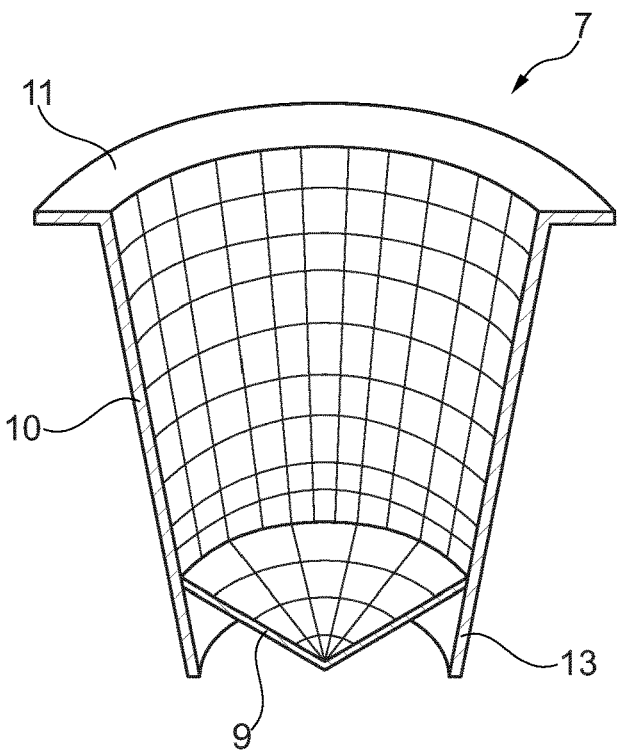
FIG. 3 shows a partial cross-sectional perspective view of a container for a system according to the invention.

FIG. 3 shows the container 7 in more detail. The bottom wall 9 has an open structure depicted by the grid like structure. The peripheral wall 10 also has an open structure, but this structure is less open, than the open structure of the bottom wall 9. This is clear from the spacing between the lines of the grid like structure of the peripheral wall 10 and the bottom wall 9.

The more dense peripheral wall 10 provides stiffness and strength to the container 7, while the less dense bottom wall 9 provides a support for a seed 8 and allows for the roots to easily grow through the bottom wall 9 towards the water.

The difference in density of the peripheral wall 10 and bottom wall 9 can easily be achieved by swirling a liquid jet of plastic on a suitably shaped mould. By depositing less plastic at the bottom part 9, a less dense open structure is obtained.

The peripheral wall 10 is provided near the bottom wall 9 with a collar 13, which protects the fragile bottom wall 9. Especially, when nesting and transporting a number of containers 7, this collar 13 together with the tapering peripheral wall 10 ensures that the bottom wall 9 is not damaged.

Figure 4:
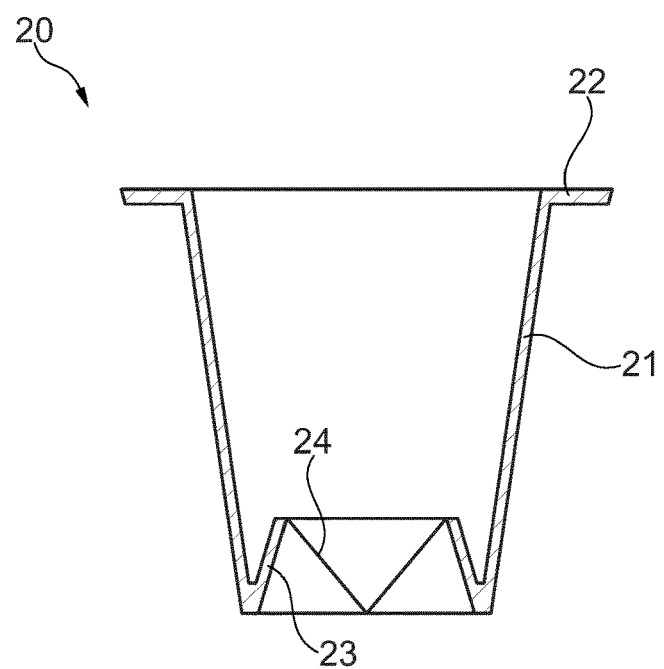
FIG. 4 shows a cross-sectional view of a second embodiment of a container for the system according to the invention.

FIG. 4 shows a second embodiment 20 of a container for the system 1 of the invention. The container 20 has a tapering peripheral wall 21 with a horizontal flange 22 at the top.

The bottom wall 23, 24 is provided by two sections in a W-shaped cross-section. The outer section 23 has the same structure as the peripheral wall 21 and provides strength and rigidity to the container 20. The inner section 24 provides a dent in the bottom 23, 24 to center a seed and has a less dense open structure than the peripheral wall 21 to allow roots to easily grow through the bottom 23, 24.

Figure 5:
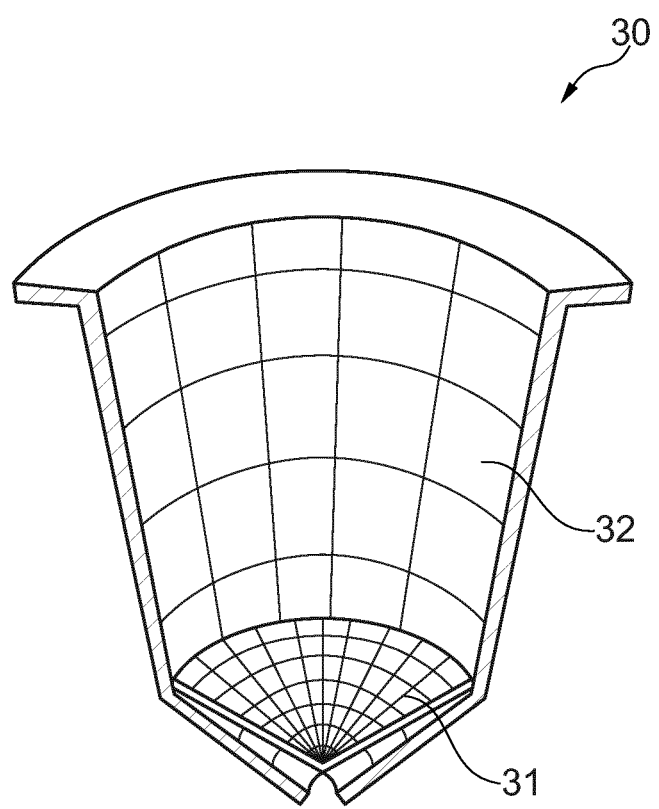
FIG. 5 shows a partial cross-sectional perspective view of a third embodiment of a container for the system according to the invention.

FIG. 5 shows a third embodiment of a container 30. The bottom wall 31 has an open structure depicted by the grid like structure. The peripheral wall 32 also has an open structure, but this structure is more open, than the open structure of the bottom wall 31. This is clear from the spacing between the lines of the grid like structure of the peripheral wall 32 and the bottom wall 31.

The peripheral wall 32 is for example made of thicker wires providing a coarser structure. The bottom end 33 of the peripheral wall 32 is folded inwardly underneath the bottom wall 31 for protection of the finer structure of the bottom wall 31. Especially, when the peripheral wall 32 is made out of thicker wires, the stiffness of these wires provide the protection, while the coarser structure of the peripheral wall 32 will not influence the growth of roots of a seed positioned on the bottom wall 31.

The invention claimed is:

1. A system for growing plants out of seeds on a water surface, which system comprises:
   a buoyant body having a flat bottom surface and a flat top surface parallel to the flat bottom surface, wherein the buoyant body is provided with a plurality of passages extending from the top surface to the bottom surface;
   a plurality of containers arranged in the plurality of passages, wherein each container has at least a bottom wall with an open structure for passage of roots of a seed, each container has a peripheral wall upstanding along a peripheral edge of the bottom wall, each container has height positioning means for positioning the bottom wall of the container at a set height relative to the bottom surface of the buoyant body, such that the bottom wall of the container is above the water surface when the buoyant body floats on the water surface, and a collar portion of the peripheral wall extends downwardly beyond the peripheral edge of the bottom wall and surrounds the bottom wall; and
   a plurality of seeds, wherein one of the plurality of seeds is positioned on the bottom wall of each of the plurality of containers without any substrate, such that each container contains no more than one seed.

2. The system according to claim 1, wherein the height positioning means comprise a horizontal flange arranged to an upper edge of the peripheral wall, which horizontal flange is supported on the flat top surface of the buoyant body.

3. The system according to claim 2, wherein the height positioning means are provided by a tapering shape of the peripheral wall of the containers and a correspondingly tapering wall of the passages.

4. The system according to claim 2, wherein the bottom wall of each container is provided with a dent for reception and positioning a seed on the bottom wall.

5. The system according to claim 2, wherein the peripheral wall has an open structure and wherein the open structure of the bottom wall is more open than the open structure of the peripheral wall.

6. The system according to claim 2, wherein the bottom wall and peripheral wall of the containers are composed out of fibres of plastic, which are adhered to each other.

7. The system according to claim 1, wherein the height positioning means are provided by a tapering shape of the peripheral wall of the containers and a correspondingly tapering wall of the passages.

8. The system according to claim 7, wherein the bottom wall of each container is provided with a dent for reception and positioning a seed on the bottom wall.

9. The system according to claim 7, wherein the peripheral wall has an open structure and wherein the open structure of the bottom wall is more open than the open structure of the peripheral wall.

10. The system according to claim 7, wherein the bottom wall and peripheral wall of the containers are composed out of fibres of plastic, which are adhered to each other.

11. The system according to claim 1, wherein the bottom wall of each container is provided with a dent for reception and positioning a seed on the bottom wall.

12. The system according to claim 11, wherein the peripheral wall has an open structure and wherein the open structure of the bottom wall is more open than the open structure of the peripheral wall.

13. The system according to claim 11, wherein the bottom wall and peripheral wall of the containers are composed out of fibres of plastic, which are adhered to each other.

14. The system according to claim 1, wherein the peripheral wall has an open structure and wherein the open structure of the bottom wall is more open than the open structure of the peripheral wall.

15. The system according to claim 14, wherein the bottom wall and peripheral wall of the containers are composed out of fibres of plastic, which are adhered to each other.

16. The system according to claim 1, wherein the bottom wall and peripheral wall of the containers are composed out of fibres of plastic, which are adhered to each other.

17. The system according to claim 16, wherein the plastic fibres are of a biodegradable material.

18. The system according to claim 17, wherein the biodegradable material comprises polyactic acid (PLA).

19. The system according to claim 16, wherein the fibres of plastic adhered to each other are manufactured by swirling a liquid jet of plastic onto a mould.

* * * * *